United States Patent [19]

Deason et al.

[11] Patent Number: 4,850,693
[45] Date of Patent: Jul. 25, 1989

[54] COMPACT PORTABLE DIFFRACTION MOIRE INTERFEROMETER

[75] Inventors: Vance A. Deason, Shelley; Michael B. Ward, Idaho Falls, both of Id.

[73] Assignee: The United States of America as represented by the United States Department of Energy, Washington, D.C.

[21] Appl. No.: 197,235

[22] Filed: May 23, 1988

[51] Int. Cl.$^4$ ............................................. G01B 9/02
[52] U.S. Cl. ..................................... 356/35.5; 356/354
[58] Field of Search ................... 356/35.5, 354, 355, 356/356

[56] References Cited

U.S. PATENT DOCUMENTS

| | | | |
|---|---|---|---|
| 4,432,239 | 2/1984 | Bykov | 356/35.5 X |
| 4,459,027 | 7/1984 | Kafri et al. | 356/376 |
| 4,474,466 | 10/1984 | McDonach et al. | 356/35.5 X |
| 4,577,940 | 3/1986 | Krasinski et al. | 350/502 |
| 4,641,972 | 10/1987 | Halioua et al. | 356/376 |

FOREIGN PATENT DOCUMENTS 177207 9/1985 Japan ............................... 356/35.5

OTHER PUBLICATIONS

McDonach et al; *Optics and Lasers in Engineering*, vol. 1, No. 2, pp. 85–105, 12/80.
McKelvie et al; *Proc. SPIE*, vol. 814, pp. 464–474, 1987.

Primary Examiner—Davis L. Willis
Assistant Examiner—Matthew W. Koren
Attorney, Agent, or Firm—Helen S. Cordell; John M. Albrecht; Judson R. Hightower

[57] ABSTRACT

A compact and portable moire interferometer used to determine surface deformations of an object. The improved interferometer is comprised of a laser beam, optical and fiber optics devices coupling the beam to one or more evanescent wave splitters, and collimating lenses directing the split beam at one or more specimen gratings. Observation means including film and video cameras may be used to view and record the resultant fringe patterns.

11 Claims, 6 Drawing Sheets

COMPACT PORTABLE DIFFRACTION MOIRE INTERFEROMETER

CONTRACTUAL ORIGIN OF THE INVENTION

The United States Government has rights in this invention pursuant to Contract No. DE-AC07-76ID01570 between the U.S. Department of Energy and EG&G Idaho, Inc.

BACKGROUND OF THE INVENTION

This invention relates to an interferometer and more particularly to a compact, portable diffraction moire interferometer useful for determining material distortion and strain.

There are numerous techniques available to determine some aspect of material distortion or strain, including holographic interferometry, speckle interferometry, photoelastic effects and strain gauges. Each of these methods has been embodied in a device which packages the technique and allows for repeated use under controlled conditions, usually by an operator not thoroughly familiar with why or how the device works.

With this invention, Applicant provides a compact, portable device, easily used by an inexperienced operator, utilizing the technique of diffraction moire interferometry. For the purpose of determining material distortion diffraction moire interferometry provides advantages not shared in total by any of the above methods. The technique of diffraction moire interferometry and diffraction grating interferometry, upon which it is based, is directly sensitive to in-plane displacements (unlike holography, photoelasticity and strain gauges), provides full field data over a substantial area (unlike strain gauges), provides excellent, variable resolution, and, finally, provides very high quality data, not degraded by laser speckle (as with holographic and speckle interferometry).

The term interferometer may be applied to any arrangement whereby a beam of light is separated into two or more parts, the parts being subsequently reunited after traversing different optical paths. Diffraction moire interferometry uses a reflective-type diffraction grating (i.e. a specimen grating) which is fixed to the object under study and illuminated by two mutually coherent collimated beams. If the illuminating beams are set at the proper incidence angles, the plus first diffraction order of one illuminating beam and the minus first diffraction order of the other beam coincide in space along a line normal to the specimen.

As a result, interference fringes (sometimes called moire patterns) representing a contour map of in-plane displacements can be observed. Comparison of fringes before and after loading can be used to determine load-induced displacements.

Sensitivity of the technique is dependent upon the frequency of the diffraction grating placed on the specimen and on the wavelength used to illuminate the grating. Sensitivities of better than 0.5 micrometer are routinely obtained, and various interpolations can further extend this resolution.

Until now, set-up for moire interferometer measurement has been ad hoc. The standard method requires complex and very clumsy optical set-ups, including lasers, spatial filters, collimators, beamsplitters, mirrors and path-matching arrangements. The procedure often requires several hours for a very experienced operator and is formidable indeed for the inexperienced.

Portable instruments have incorporated a method of mechanical interference which also employs moire patterns but this method, called moire deflectometry or coarse moire, is distinguishable from diffraction moire interferometry (see U.S. Pat. No. 4,577,940 Krasinski et al.) Coarse moire are produced by superpositioning two coarse amplitude gratings in intimate contact. As one grating is distorted, areas of light and dark appear, due to the mechanical obstruction of light by the opaque bars of the gratings. Sensitivity is increased by using gratings of fine pitch and high spatial frequency (see further, Daniel Post, "Optical Interference for Deformation Measurements," *Mechanics of Nondestructive Testing*, 1980.)

The so-called moire patterns of diffraction moire interferometry are sometimes explained as the result of the same kind of mechanical obstruction, between the specimen grating and what is termed a "virtual reference grating"—the array of fringes, and the walls of interference from which they are derived. While there is no physical reality to this explanation, it is sometimes convenient conceptually (see Daniel Post, "Moire Interferometry", *Handbook on Experimental Mechanics*, 1987, p. 333).

Moire deflectometry has been preferred to diffraction moire interferometry because it involves very simple alignment and therefore is much easier and less expensive to set up (see for example, U.S. Pat. No. 4,459,027, Kafri et al., and U.S. Pat. No. 4,577,940, Krasinski et al.). However, coarse moire does not provide adequate resolution for many modern applications.

It is an object of this invention to provide an improved apparatus for the measurement of deformed gratings.

It is another object of this invention to provide an improved apparatus for determination of material distortion or strain.

It is another object of this invention to provide a diffraction moire interferometer which is compact, portable, convenient to use, and requires little user familiarity with the underlying concepts.

Additional objects, advantages and novel features of the invention will become apparent to those skilled in the art upon examination of the following and by practice of the invention.

SUMMARY OF THE INVENTION

To achieve the foregoing and other objects, this invention comprises a novel improved compact and portable moire interferometer used to determine surface deformations of an object. The improved interferometer is comprised of a laser beam, optical and fiber optics devices coupling the beam to one or more evanescent wave splitters, and collimating lenses directing the split beam at the specimen grating. Means are provided for viewing the resultant fringe patterns.

The system is portable and can be used on-site. Set up and alignment time averages about 20 minutes, and similar time is all that is required if the system or grating is changed during operation. Operator training is considerably reduced.

BRIEF DESCRIPTION OF THE DRAWINGS

The present invention is illustrated in the accompanying drawings where.

DETAILED DESCRIPTION OF THE INVENTION

Figure 1:
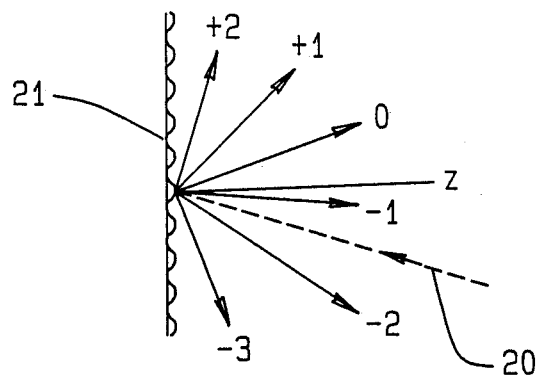
FIG. 1 shows the basic function of a diffraction grating, that is, dividing an incident beam into a number of diffracted beams.

Diffraction gratings are used to disperse the frequency components in an incident light beam into a spectrum. The exit angle is a function of the beam incident angle and its wavelength. As depicted in FIG. 1, for a laser with a single wavelength of emission, the incident beam 20 is simply redirected by the grating 21 into new beams at fixed angles. The multiple beams generated are called diffraction orders. The zero order 0 is the "normal" reflection, where the angle of incidence equals the angle of reflection. The various output diffraction orders are designated $\pm 1$, $\pm 2$, etc.

Figure 2:
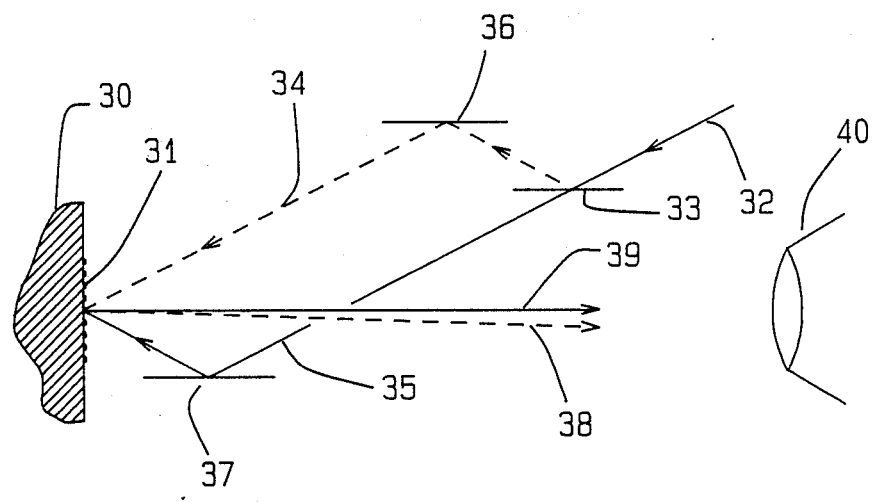
FIG. 2 is a schematic diagram of a diffraction moire interferometer of the prior art, using the standard elements including a beamsplitter and mirrors.

As depicted in FIG. 2, the usual procedure of diffraction moire interferometry is to replicate an aluminized diffraction grating 31 onto the specimen 30. An incident beam 32, which may be a laser beam, is split into two beams by a beam splitter 33, thereby insuring that the beams 34 and 35 directed to the specimen 30 are mutually coherent. Mirror 36 is employed to collimate the beam 34 and mirror 37 collimates the beam 35, directing the beams to the specimen 30. Diffraction by the specimen grating 31 produces output beam 38 and output beam 39. Under a load or deformed condition, a pattern of constructive and destructive interference is formed, which appears to the imaging device 40 as fringes of bright and dark.

The physical cause of fringe production is that loading the specimen 30 distorts the specimen, thereby distorting the grating 31. Uniform distortion, for example, perpendicular to the grating grooves, will create a grating of lower groove density. This implies that the diffraction orders generated by illuminating the grating 31 will exit the grating 31 at a different angle, obeying the grating equation:

$$\sin B_m = \sin A + m*\lambda*F$$

where m = the diffraction order under the consideration (m = 1 in the example)
B = the exit angle of the mth diffraction order relative to the normal to the grating
A = the angle of incident beam relative to the normal
$\lambda$ = the wavelength of light used to illuminate the grating
F = the grating groove density (lines/mm for example)

The two first order diffraction beams created by the two incident beams will no longer be aligned and will interfere to produce fringes. In the case of uniform extension or compression, the resulting fringes will be parallel to each other and to the grating groove direction, with more deformation creating more and finer fringes. If the deformation varies locally over the specimen, then the density and orientation of the fringes will vary similarly. The resulting fringe pattern can be analyzed to yield the local extent and nature of the deformation.

Sensitivity of the diffraction moire interferometer is due to the use of diffraction gratings with very fine spacing (resolution is inversely proportional to the grating spatial frequency). Coarse gratings, used commonly with moire deflectometers, are in the order of 20 to 40 lines/mm. Fine gratings used for diffraction moire interferometry may range in spatial frequency from 100 lines/mm all the way up to 2000 lines/mm (50,800 lines/inch).

The sensitivity of the instrument is also dependent upon the accuracy of its alignment, and this is where the instrument depicted in FIG. 2 is most lacking. Incident beam 34 and incident beam 35 must be adjustable with an angular accuracy of one part in 100,000. The mirrored system in FIG. 2 accomplishes this using a complex arrangement of beamsplitters, mirrors, path matching arrangements and stable supports for the components. The critical beam intersection angle must be exact, and any change in the specimen grating 31 requires that the entire setup process be repeated, often taking several hours even for a very experienced operator.

Figure 3:
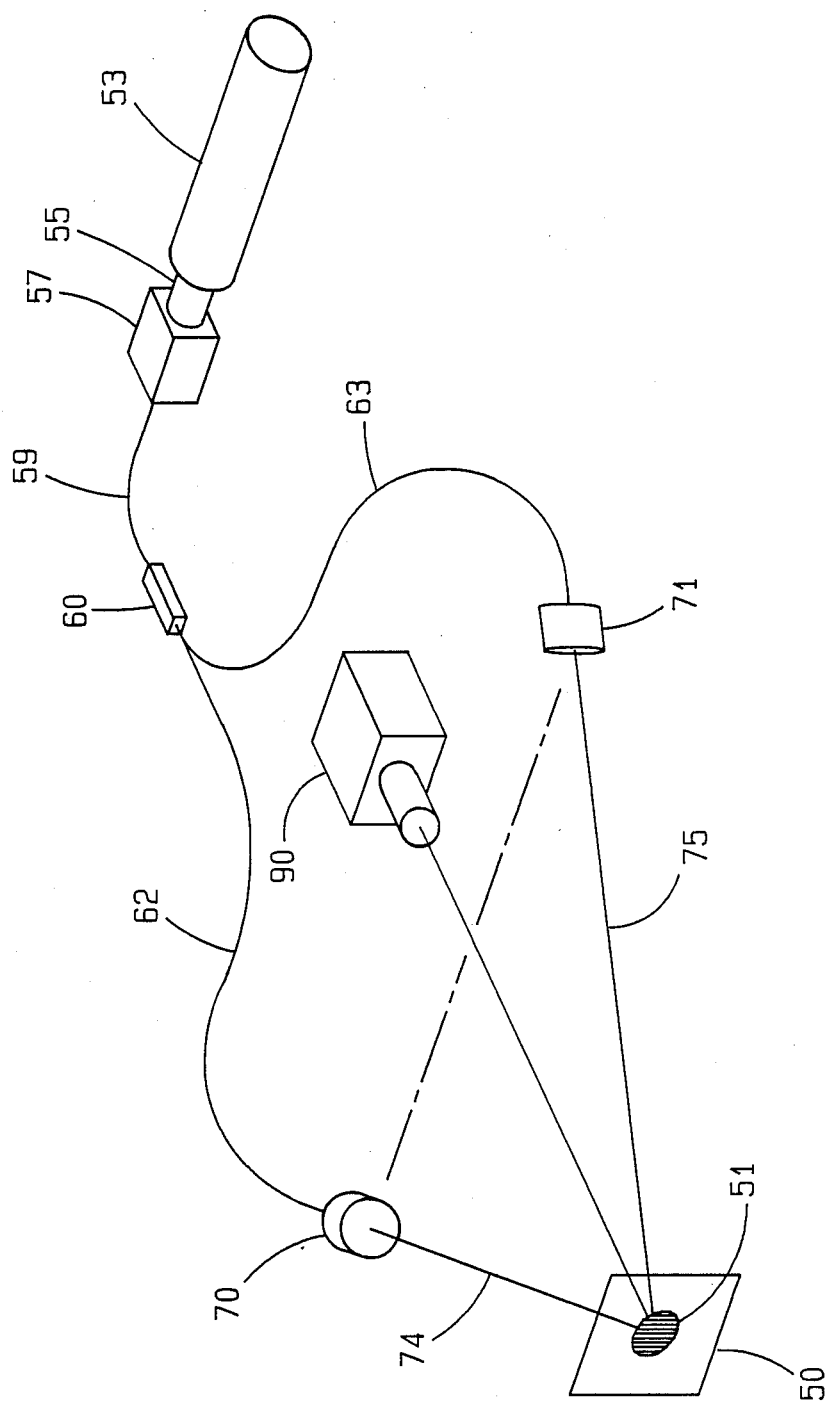
FIG. 3 is a schematic diagram of the preferred embodiment of the present invention, using a laser and fiber optics; the laser beam is split into two incident beams.

FIG. 3 is a schematic diagram of the preferred embodiment of the present invention. A laser 53 directs a laser beam to a fiber optic coupler 57. The signal is then split by an evanescent wave fiber optic beam splitter 60 (also called a coupler) and the resulting two beams pass respectively through optical fiber 62 to collimating lens 70 and through optical fiber 63 to collimating lens 71. Incident beam 74 and incident beam 75 are directed onto the specimen 50 and the diffraction grating 51. Interference patterns are viewed by an imaging device 90.

In the preferred embodiment, the laser 53 is a 10 mw single mode polarized HeNe laser which has a beam diameter of about 0.6 mm. A beam expander 55 increases the diameter of the laser output beam to the optimal input diameter of the laser-to-fiber optic coupler 57. The intervening beam expander 55 increases the useful power of the HeNa laser 53 by a power of three, enabling use of a less powerful laser, and, like the use of a fast shutter on a camera, making the interferometer less sensitive to vibrations.

The laser-to-fiber optic coupler 57 serves to focus the output beam of the laser down to the 5 micrometer spot needed to enter the optical fiber 59 efficiently. The function of the fiber optic beam splitter 60 is to distribute the beam power equally between two polarization maintaining, single mode optical fibers 62 and 63. In doing so, the device does not distort the beam optical wavefront excessively, and does not disturb the polarization of the output beams 74 and 75. The output beam powers are also closely matched to produce good quality data.

Using fiber optics, the laser 53 may be mounted remotely, using a fiber optic link (not shown). Mounting the laser 53 remotely will facilitate the use of a more powerful laser, if that is necessary in a particular application.

The fiber optic system works as well to provide spatial filtering of the laser beam. In the prior art, this function is usually provided by an external device consisting of a lens and matching pinhole, whereby the laser beam is focused to a small spot by the lens and passes through the pinhole. Due to the characteristics of the laser beams, the fundamental transverse mode of the laser, the $TEM_{00}$ mode, is focused to the smallest spot, while the other modes (which lead to erratic intensity variations in the beam) focus to larger spots and are blocked by the pinhole substrate. Thus, the beam exiting the pinhole has fewer transverse intensity variations, and is said to be "cleaner". In the present invention, since the single mode fiber 62 has a core only 5 microns in diameter, only the $TEM_{00}$ mode is captured by the fiber and transmitted along its length. Thus, the fiber 62 and laser-to-fiber coupler 57 in combination perform a spatial filtering function. The output beam 74 is therefore very clean. Similarly, the fiber 63, which also has a core of 5 microns in diameter, and coupler 57 perform a filtering function and the output beam 75 is very clean.

The small (5 micron diameter) beam of laser light exiting the optical fiber 62 must be expanded to a useful diameter (often 25 to 50 mm) and then collimated, thereby preventing the beam from spreading further. The beam exiting the fiber 62 naturally expands in a cone, so generally no other effort is required to expand the beam until it has expanded sufficiently to cover the lens 70. If the distance from the end of the fiber 62 to the lens 70 is equal to the lens focal length, then the beam exiting the lens 70 will be well collimated. Similarly, if the distance from the end of fiber 63 to the lens 71 is equal to the lens focal length then the beam exiting the lens 71 will be well collimated. The lenses 70 and 71 should be well corrected and have multiantireflection coatings throughout.

Slight adjustments to the collimation can be made with the lens focus mechanism or by moving the end of the fiber 62 relative to the lens 70 or the end of the fiber 63 relative to the lens 71. The lens aperture should be wide open in general, since closing down the lens iris simply reduces the beam diameter without dimming the beam.

The most convenient and inexpensive lenses for collimation are high quality camera lenses, but for very demanding applications specially designed lenses may be preferable. For a 50 mm output beam, an f/5 200 mm focal length lens is suitable.

Figure 4:
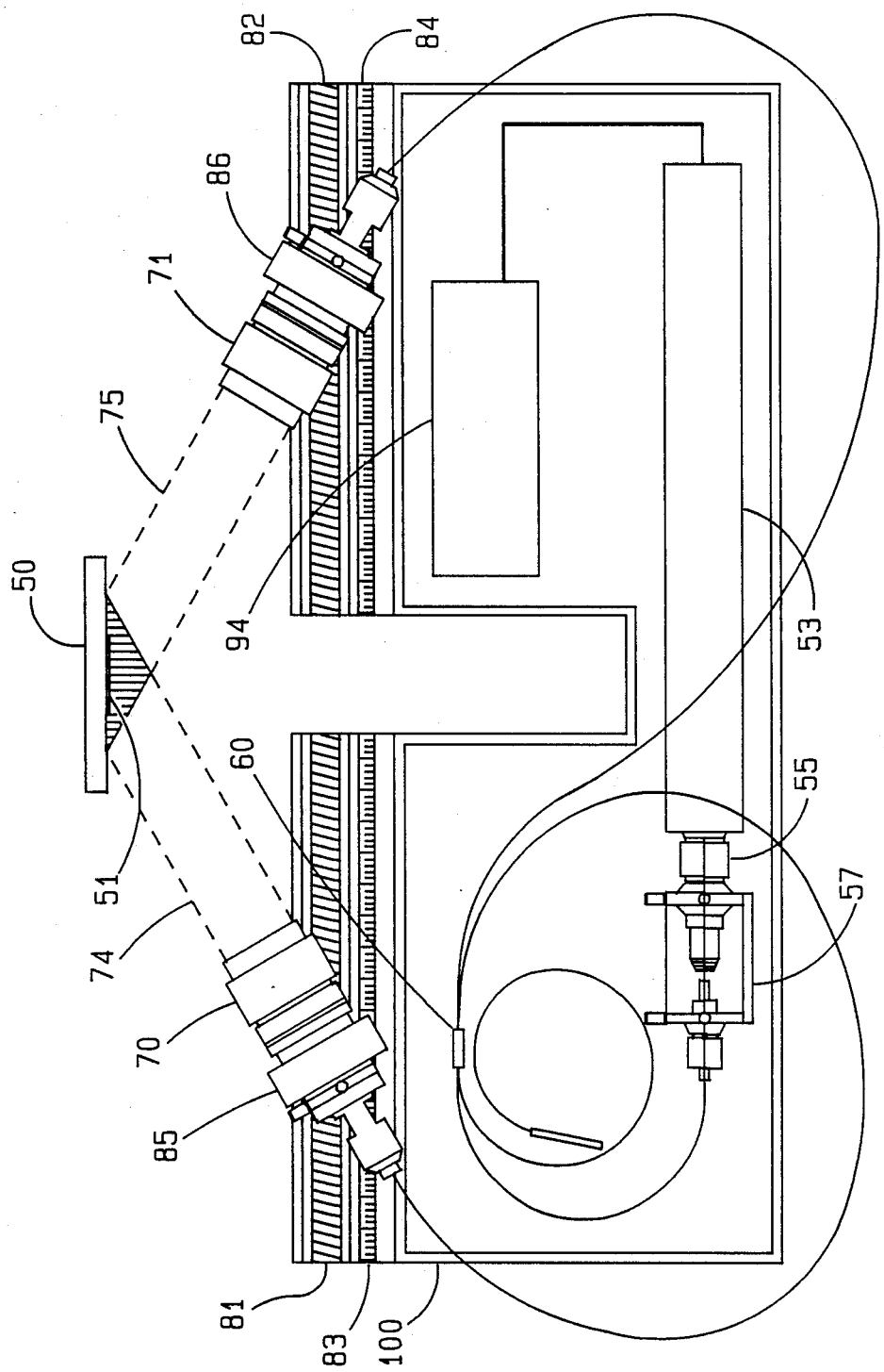
FIG. 4 also depicts the preferred embodiment of the present invention, showing the instrument which incorporates the components diagrammed in FIG. 3.

The devices of FIG. 3 are placed in or mounted on a metal enclosure 100, depicted in FIG. 4 to provide a compact portable diffraction moire interferometer. The enclosure 100 is made of welded sections of ¼ inch aluminum plate with two removable lids (not shown) of ⅛ inch aluminum sheet. In the preferred embodiment, the specific form chosen was designed to provide a highly flexible research instrument. More specialized applications may require fewer adjustments and a simpler or smaller configuration might be appropriate.

Within the enclosure 100 are the HeNe laser 53 and its power supply 94, the laser beam expander 55, the fiber optic coupler 57, and the fiber optic beamsplitter 60. A pair of rack and pinion carriers 81 and 82 and rails 83 and 84 are mounted on the top of the enclosure 100. These are designed to hold the collimating lens assemblies 70 and 71 respectively and to adjust their lateral position relative to each other and to the specimen 50.

The collimating assemblies 70 and 71 have rotary adjustments 85 and 86 respectively which permit coarse angular positioning in a horizontal plane. This supports a lens mount which permits fine angular adjustments over about ±3 degrees in both the horizontal and vertical planes. A fixed ball (not shown) defines the rear contact point of the enclosure 100 with the table, and a pair of leveling screws (not shown) at the opposite ends of the box near the front provide some adjustment of the orientation of the box relative to the specimen 50.

An imaging device usually a film or video camera (not shown), can be either internal, attached to the top of the enclosure 100, or external, separately supported by a tripod or other device (not shown). The imaging device must be arranged so as to be directed at the specimen grating 51 and so as to permit the ±1 diffraction orders to enter the device and to be imaged on the recording material (imaging devices which have mechanical movements, such as shutters, should not be mounted on the enclosure 100 to avoid excess vibration). Alternately, the interference patterns may also be observed by direct human vision, with the aid of a device such as an opaque screen, diffusing screen, or magnifying lens placed in the line of sight between the specimen grating and the viewer.

Alignment of the compact, portable interferometer depicted in FIG. 4 has the purpose of adjusting the angles of incident beam 74 and incident beam 75, and the specimen grating 51 so that the first order diffraction beams exit the grating 51 normal to the grating surface. When this criteria is met, the first diffraction orders from each of the two incident beams 74 and 75 will be perfectly aligned and will interfere to generate an interference pattern. Thus, the collimating lenses 70 and 71 are adjusted so that the beams 74 and 75 interact in the plane of the specimen 50, and so that the lenses 70 and 71 are equidistant from the midpoint of the rail system 83 and 84.

Alignment is accomplished in four basic steps, requiring little or no operator experience with optical instruments or the method of diffraction moire interferometry. Of course, caution should be exercised throughout, because eye or skin damage could result due to excessive exposure to the laser beam.

First, the intensity of the laser 53 is adjusted and focused on the fiber end of the laser-to-fiber coupler 57. Maximum intensity of the fiber output beam will occur when the laser spot lies on the fiber core.

Second, the beam intersection angle is set. The angle of beams 74 and 75 is constant for each grating groove density and is available in a table look-up format. For example, for a diffraction grating with spatial frequency of 1200 lines/mm, the angle between 74 or 75 and normal will be 49.41 degrees. Using the current invention, the beam angle is set roughly by adjusting the rotary posts on the rack and pinion carriers 81 and 82 supporting the collimating lenses 70 and 71 respectively. Fine adjustment is completed using the angular adjustments 85 and 86.

Third, the separation of the collimating lenses 70 and 71 is adjusted. For a given beam angle, the separation between the collimators 70 and 71 determines where the beams intersect, and hence where the specimen 50 will be located. The intersection of beams 74 and 75 is observed on a card, and the collimating lenses 70 and 71 are moved until the intersection lies in the specimen plane. The collimators 70 and 71 should be equidistant from the midpoint of the rail system 83 and 84.

Fourth, the specimen grating 51 or an identical reference grating is placed so that it is centered between the collimating lenses 70 and 71 and so that the surface of the grating 51 is perpendicular to the line bisecting the beam angle as well as the viewing direction. This is accomplished by adjusting the angles of beams 74 and 75, and then rotating the grating 51, or the enclosure 100, so that the reflection (i.e. the zero diffraction order) of beam 74 hits the center of the opposite lens 71, and the reflection of beam 75 hits the center of lens 70.

The interferometer depicted in FIG. 4 accomplishes the object of the present invention, to provide a diffraction moire interferometer which is compact, portable, convenient to use, and requires little user familiarity with the underlying concepts.

Figure 5:
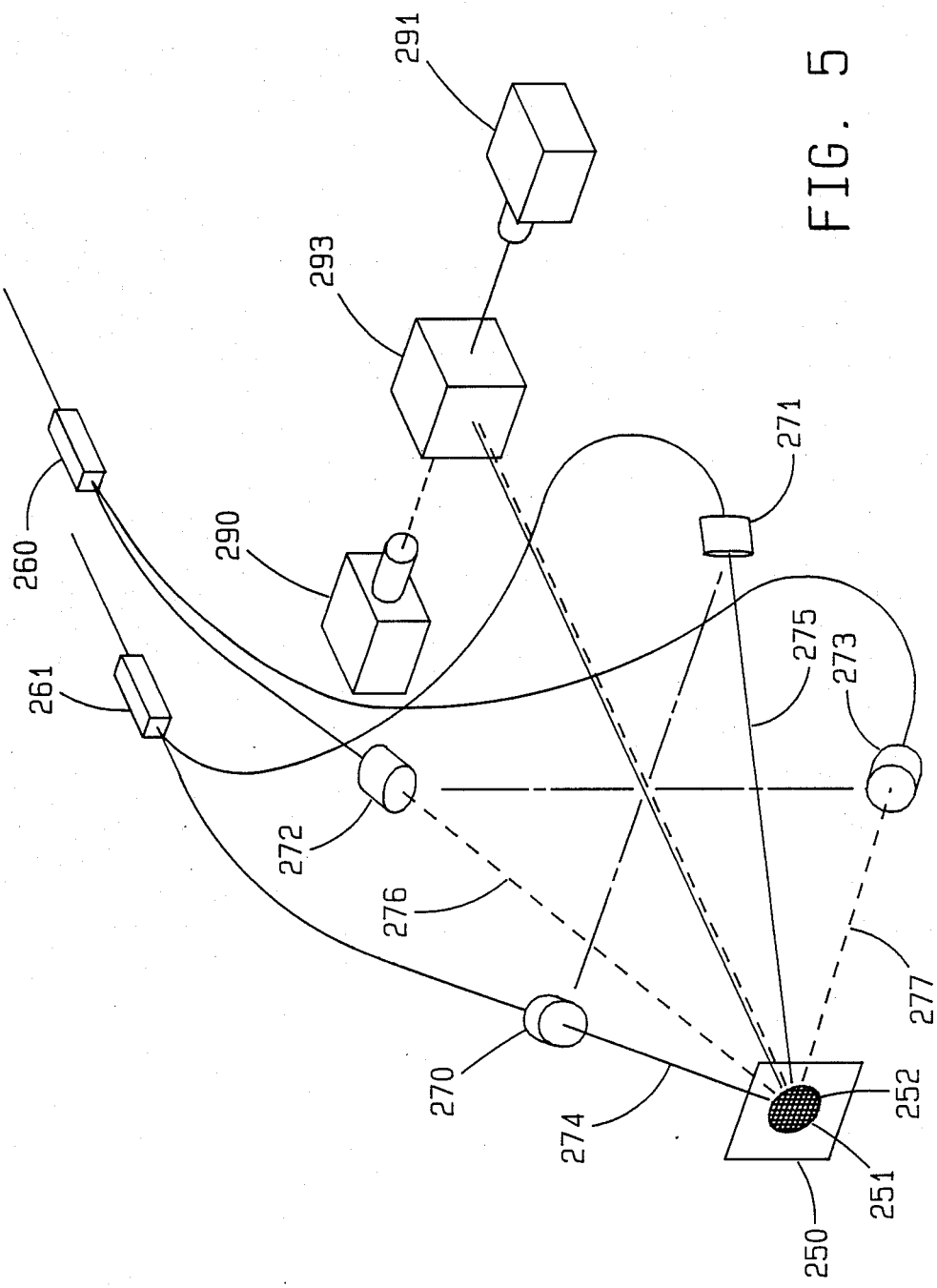
FIG. 5 is a schematic diagram of an alternate embodiment of the present invention; four beams illuminate two specimen gratings.

FIG. 5 is a schematic diagram of a four beam system—an alternate embodiment of the present invention which expands the capability of the instrument by permitting the determination of material distortion or strain in both x and y directions simultaneously.

A normal diffraction grating consists of a series of parallel lines or grooves. Illumination of the grating by two mutually coherent laser beams in the manner described above yields information about distortions perpendicular to the grating grooves. Resolution of the distortions parallel to the grating grooves is accomplished by superimposing two gratings and illuminating the two gratings with two pair of mutually coherent laser beams.

Referring to FIG. 5, the output of one laser (not shown) is split by beamsplitter 260 and the output of a second laser (not shown) is split by the beamsplitter 261. Collimating lenses 270 and 271 direct a pair of incident beams 274 and 275 respectively and collimating lenses 272 and 273 direct a pair of incident beams 276 and 277 respectively. The lasers (not shown) may be but need not be matched—for example, one may be an HeNe laser and the other may be a diode laser, as long as each has adequate power and coherence, is compatible with the fiber optics used, and is within the spectral region of a suitable imaging device. The incident beams 274, 275, 276 and 277 are directed by the collimating lenses 270, 271, 272 and 273 respectively to two specimen gratings 251 and 252, superimposed so that the grooves of grating 251 are perpendicular to the grooves of grating 252, and vice versa.

If the incident beams 274, 275, 276 and 277 are precisely aligned, the interference patterns created by the diffracted beams will be coincident. Slight misaligning will allow two imaging devices 290 and 291 to view two interference patterns. In FIG. 5, beam separator 293 is used to separate the coincident beams. A beam separator might be constructed using long focal length lenses to direct the data beams to one or more mirrors, which in turn would then convey the beams to the imaging devices 290 and 291.

Figure 6:
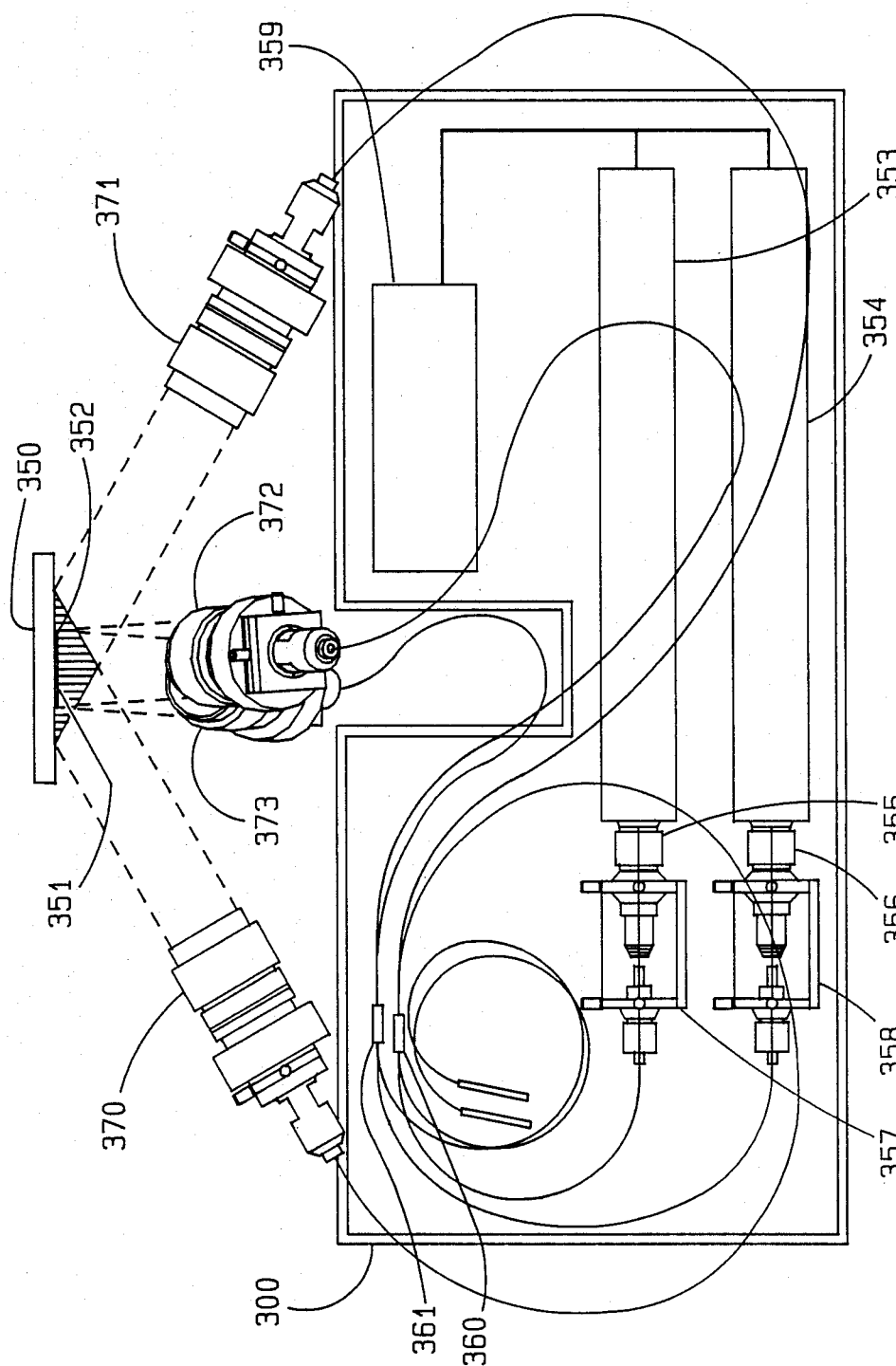
FIG. 6 depicts the instrument which embodies the four beam system.

FIG. 6 depicts a compact, portable instrument which embodies the four beam system. Two lasers 353 and 354 draw upon the same power source 359. The beam of laser 353 is expanded by expander 355, joined with the fiber optics by a coupler 357, divided into two signals by splitter 360, and focused by collimating lenses 370 and 371 on the specimen grating 351. Similarly, the beam of laser 354 is focused by collimating lenses 372 and 373 on specimen grating 352. With the collimating lenses 370, 371, 372 and 373 properly aligned, and the grooves of specimen grating 351 being perpendicular to the grooves of specimen grating 352, imaging devices (not shown) aided by a beam separator (not shown) will view the interference patterns representing material distortion of the specimen 350 in both x and y directions.

In some applications it is desirable to determine material distortion in x and y directions and with 45 degrees displacement. A three beam moire interferometry system provides this determination, using three separate beams derived from the same laser so that the three beams are mutually coherent. As illustrated in the schematic diagram of FIG. 7, this is accomplished by using two successive polarization maintaining, single mode fiber optic beamsplitters 460 and 461. The first beamsplitter 460 may be variable to permit adjustment of the relative intensities of the beams to compensate for any losses in the fibers or couplers.

As in the four beam system, two diffraction gratings 451 and 452 are superimposed so that the grooves of one grating are perpendicular to those of the other. The collimating lenses 470, 471 and 472 are respectively placed at the vertices of a right triangle, so that the normal to the specimen passes through the center of the hypotenuse of the right triangle. This arrangement of collimating lenses 470, 471 and 472 accomplishes a 45 degree displacement from x and y directions.

Figure 7:
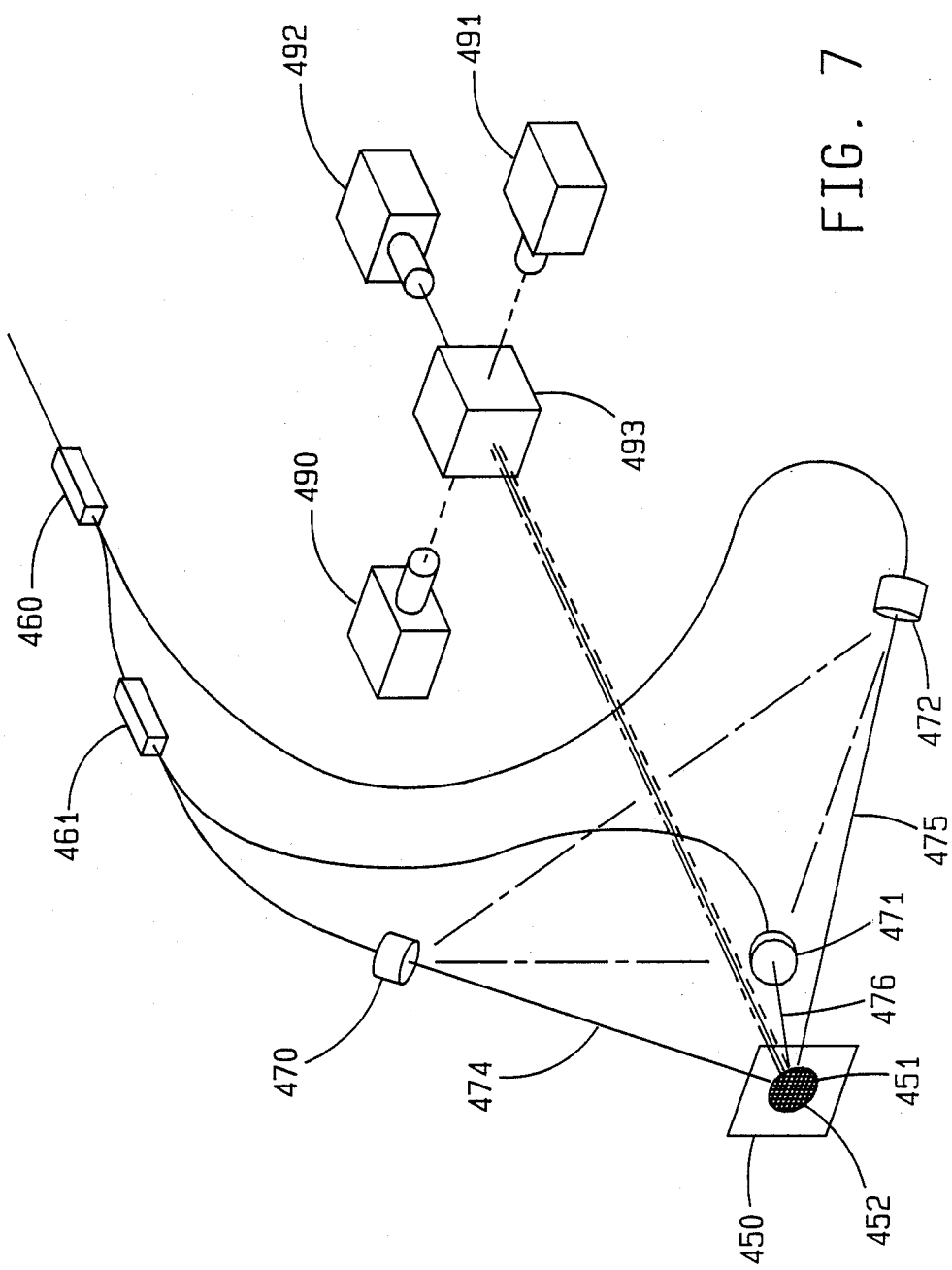
FIG. 7 is a schematic diagram of another alternate embodiment of the present invention; a laser beam is split into three incident beams.

Again, as with the four beam system, if the incident beams 474, 475 and 476 are precisely aligned, the interference patterns created by the diffracted beams will be coincident. It is possible to view each interference pattern independently by blocking first beam 474, then beam 475, then beam 476, and recording the fringe pattern generated by each remaining pair of beams. As illustrated in FIG. 7, a beam separator 493 can also be used so that the three interference patterns can be recorded simultaneously.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical application and enable others skilled in the art to utilize the invention in various embodiments and with various modifications as are suited to the particular use contemplated. It is intended that the scope of the invention be defined by the claims appended hereto.

The embodiments of this invention in which an exclusive property or privilege is claimed are defined as follows:

1. A method of determining in-plane surface deformations of an object on the basis of diffraction of rays by a diffraction grating replicated onto the surface of said object, the steps comprising:
   providing from a source a beam of coherent light;
   coupling said beam to a polarization maintaining, single mode optical fiber,
   connecting said polarization maintaining single mode optical fiber to a fiber optic evanescent wave beam splitter;
   using said fiber optic beam splitter, splitting said beam of coherent rays into at least two mutually coherent beams,
   directing said mutually coherent beams at one or more diffraction gratings replicated onto the surface of said object so as to conform to its surface deviations, identifying and measuring interference patterns created by diffraction of said mutually coherent beams as a result of deviations in said diffraction gratings.

2. The method of claim 1 wherein said source of a beam of coherent rays is a laser.

3. An interferometer for performing the method of diffraction moire, comprised of:
a source of a beam of coherent light,
coupling means for coupling said beam of coherent light into a polarization maintaining, single mode optical fiber.
beam splitting means for splitting said beam of coherent light from said optical fiber into at least two beams of mutually coherent light,
collimating means, directing said mutually coherent beams at one or more diffraction gratings replicated onto the surface of a work piece,
observation means for viewing and measuring interference patterns created by the diffraction of said beams by said diffraction gratings.

4. The interferometer of claim 3 wherein said source of a beam of coherent light is a laser.

5. The interferometer of claim 3 wherein said beam splitting beams is a fiber optic evanescent wave beam splitter or coupler.

6. The interferometer of claim 4 wherein said laser is mounted remotely.

7. The interferometer of claim 3 comprising means for mounting and adjusting said collimating lenses so that the angle at which said mutually coherent beams strike said diffraction grating can be adjusted within an accuracy of one part in 100,000.

8. The interferometer of claim 3 wherein said observation means is an integral film camera.

9. The interferometer of claim 3 wherein said observation means is an external film camera.

10. The interferometer of claim 3 wherein said observation means is an integral video camera.

11. The interferometer of claim 3 wherein said observation means is an external video camera.

* * * * *